US009531296B2

(12) United States Patent
Urushibata et al.

(10) Patent No.: US 9,531,296 B2
(45) Date of Patent: Dec. 27, 2016

(54) NEUTRAL-POINT-CLAMPED MULTILEVEL POWER CONVERSION DEVICE

(71) Applicant: MEIDENSHA CORPORATION, Tokyo (JP)

(72) Inventors: Shota Urushibata, Odawara (JP); Masakazu Muneshima, Shizuoka (JP); Hui Zhang, Singapore (SG)

(73) Assignee: MEIDENSHA CORPORATION, Tokyo (JP)

( * ) Notice: Subject to any disclaimer, the term of this patent is extended or adjusted under 35 U.S.C. 154(b) by 188 days.

(21) Appl. No.: 14/358,965

(22) PCT Filed: Nov. 16, 2012

(86) PCT No.: PCT/JP2012/079824
§ 371 (c)(1),
(2) Date: May 16, 2014

(87) PCT Pub. No.: WO2013/073678
PCT Pub. Date: May 23, 2013

(65) Prior Publication Data
US 2014/0313804 A1    Oct. 23, 2014

(30) Foreign Application Priority Data

Nov. 18, 2011    (JP) ................................ 2011-252594

(51) Int. Cl.
*H02M 7/487* (2007.01)
*H02M 7/521* (2006.01)
(Continued)

(52) U.S. Cl.
CPC ............... *H02M 7/487* (2013.01); *H02M 1/12* (2013.01); *H02M 1/14* (2013.01); *H02M 7/521* (2013.01); *H02M 7/537* (2013.01)

(58) Field of Classification Search
CPC ...................................................... H02M 7/487
(Continued)

(56) References Cited

U.S. PATENT DOCUMENTS

2012/0281442 A1*  11/2012  Revelant ............... H02M 7/487
363/40

FOREIGN PATENT DOCUMENTS

JP    5-268773 A    10/1993
JP    6-261551 A    9/1994
(Continued)

OTHER PUBLICATIONS

The Institute of Electrical Engineers of Japan, semiconductor power conversion research presentation materials SPC-91-37, pp. 111-120.

*Primary Examiner* — Jeffrey Gblende
*Assistant Examiner* — Trinh Dang
(74) *Attorney, Agent, or Firm* — Foley & Lardner LLP (57) ABSTRACT

The present invention provides a power conversion device in which an on-pulse bias voltage and a neutral-point bias voltage do not interfere with each other. A power conversion device 1 of the present invention has a polarity judgment section 8 that judges a polarity of a neutral-point bias voltage $V_{NPC}$ calculated by a neutral-point potential fluctuation suppression control section 4 of a voltage command value control circuit 3, then on the basis of this polarity of the neutral-point bias voltage $V_{NPC}$, selects a polarity of an on-pulse bias voltage $V_{MPC}$ by an on-pulse control section 5. With this control, it is possible to prevent for the polarities of the neutral-point bias voltage $V_{NPC}$ and the on-pulse bias voltage $V_{MPC}$ from being different then prevent for the both bias voltages from interfering with each other.

2 Claims, 5 Drawing Sheets (51) Int. Cl.
    *H02M 1/14*    (2006.01)
    *H02M 1/12*    (2006.01)
    *H02M 7/537*   (2006.01)

(58) Field of Classification Search
    USPC ......................................................... 363/132
    See application file for complete search history.

(56) References Cited

FOREIGN PATENT DOCUMENTS

| | | |
|---|---|---|
| JP | 7-79574 A | 3/1995 |
| JP | 9-74767 A | 3/1997 |
| JP | 9-84360 A | 3/1997 |
| JP | 2006-141090 A | 6/2006 |
| JP | 2009-232621 A | 10/2009 |

\* cited by examiner

NEUTRAL-POINT-CLAMPED MULTILEVEL POWER CONVERSION DEVICE

TECHNICAL FIELD

The present invention relates to a neutral-point-clamped multilevel power conversion device (hereinafter called an NPC power converter), and more particularly to an NPC power converter that prevents degradation in response of a neutral-point potential fluctuation suppression control while securing on-pulse of a switching element.

BACKGROUND ART

Figure 3:
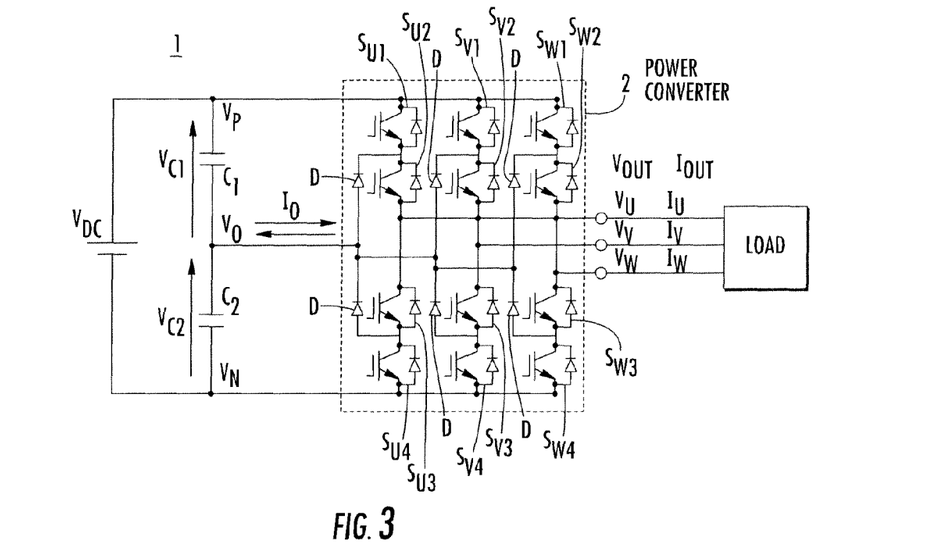
FIG. 3 is a circuit configuration showing an example of a power conversion device to which a general NPC power converter is applied.

A configuration of a conventional general NPC power converter is shown in FIG. 3. In the following description, a minimum on-pulse width control and a neutral-point potential fluctuation suppression control of the NPC power converter will be explained with reference to FIG. 3.

[Minimum On-Pulse Width Control]

In a case where a switching element (e.g. GTO) that has a limit on a minimum value of an on-pulse width (time) is used for switching elements $S_{U1} \sim S_{U4}$, $S_{V1} \sim S_{V4}$ and $S_{W1} \sim S_{W4}$ of a three-phase NPC power converter 2, a pulse signal that is shorter than the limit of the minimum value of the on-pulse width might arise during a time period during which a voltage command value is present in the vicinity of zero-voltage. In such case, the switching element such as the GTO can not perform the switching then a voltage control becomes impossible for the time period for which the voltage command value is present in the vicinity of zero-voltage.

Further, also in a case where a switching element that has no limit of the on-pulse width is used in the three-phase NPC power converter 2, due to a dead-time that is set to prevent a short circuit of upper and lower arms of an inverter, an output pulse that is a dead-time width or less disappears, then the voltage control becomes impossible for that time period.

As a solution for the problems, there has been known a method in which a bias voltage is added to all phases of three-phase voltage command values so that all the phases of the three-phase voltage command values become a predetermined minimum on-pulse width or greater (see Patent Document 1). The bias voltages added here are set to the same value in all the three phases in order not to affect a line voltage of the three phases. Further, in general, as a method, this bias voltage is calculated so as to be a minimum in order to suppress fluctuation of the neutral-point potential due to this control.

[Neutral-Point Potential Fluctuation Suppression Control]

In a power conversion device 1 as shown in FIG. 3, when outputting a DC voltage of a neutral-point to the three-phase NPC power converter 2, a neutral-point current $I_o$ flows through a DC neutral-point. Therefore, due to this neutral-point current $I_o$, voltages of two DC capacitor components at positive and negative sides which produce the neutral-point deviate from each other, then fluctuation occurs in a neutral-point potential $V_o$. It is generally known that the neutral-point potential $V_o$ fluctuates at a cycle period of triple the output AC frequency.

As a method for solving this problem, a method, in which DC voltages $V_{C1}$, $V_{C2}$ of both positive and negative side capacitors $C_1$, $C_2$ are detected and the bias voltage calculated from their difference (e.g. calculated by a PID control etc.) is equally added to the three-phase voltage command values, has been known.

Figure 4:
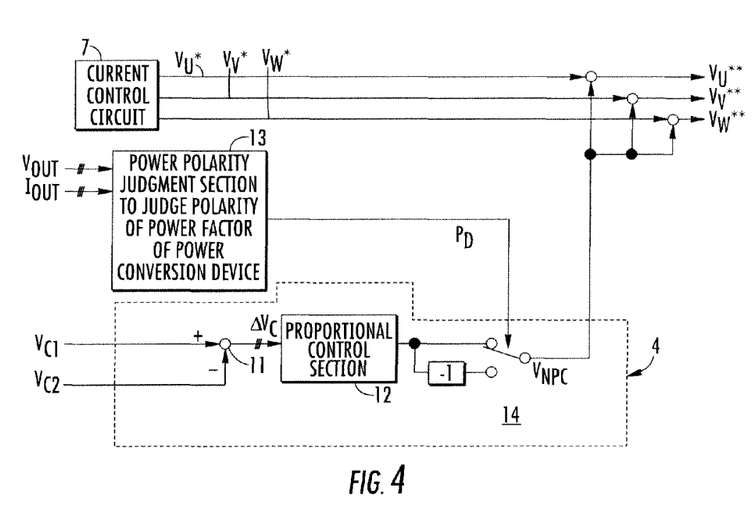
FIG. 4 is a control block diagram showing an example of a neutral-point potential fluctuation suppression control section.

For instance, taking into consideration the fact that a direction of the bias voltage to be added changes between in a power-running state and in a regenerative state of drive mode of an inverter output, as shown in a neutral-point potential fluctuation suppression control section in FIG. 4, a method, in which the drive mode is detected by a polarity of a power factor of the inverter output ($V_{out}$, $I_{out}$) and the polarity of the bias voltage is changed by that detection result, has been known (see Non-Patent Document 1).

Further, a method, in which a value is obtained by multiplying a bias value calculated from the difference between the capacitor voltages $V_{C1}$, $V_{C2}$ by an even order wave of output frequency of the inverter and this value is added to a voltage command value $V^*$ ($V_U^*$, $V_V^*$, $V_W^*$), has been disclosed (see e.g. Patent Document 2). In this method, it becomes unnecessary to detect the polarity of the power factor.

CITATION LIST

Patent Document

Patent Document 1: Japanese Patent Application Publication No. JP05-268773 (paragraphs [0002]18 [0005], FIG. 20)
Patent Document 2: Japanese Patent Application Publication No. JP07-079574 (paragraphs [0037]~[0039], FIG. 1)
Patent Document 3: Japanese Patent Application Publication No. JP06-261551 (paragraphs [0018]~[0044])
Patent Document 4: Japanese Patent Application Publication No. JP09-84360 (paragraphs [0010]~[0015], [0016]~[0018])

Non-Patent Document

Non-Patent Document 1: The Institute of Electrical Engineers of Japan, semiconductor power conversion research presentation materials SPC-91-37

SUMMARY OF THE INVENTION

Each of the above two conventional control methods (the minimum on-pulse width control, the neutral-point potential fluctuation suppression control) is a method in which the bias value is added to the voltage command value. Because of this, both bias values interfere with each other.

Figure 5:
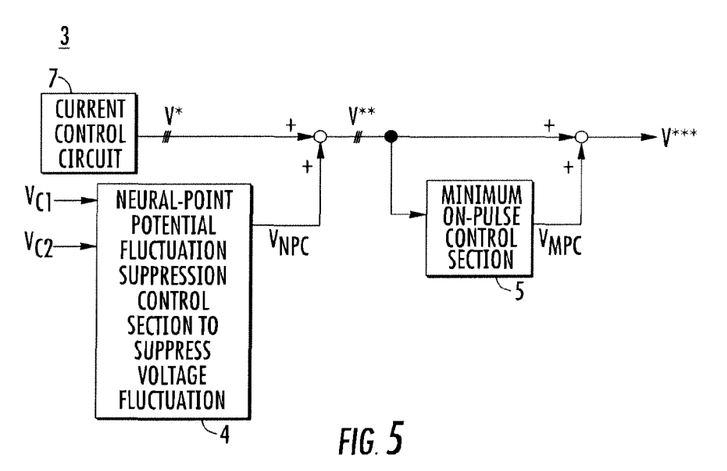
FIG. 5 is a block diagram showing an example of a voltage command value control circuit of a conventional power conversion device.

FIG. 5 is a block diagram showing an example of a conventional voltage command value control circuit 3 in which the two control methods (the minimum on-pulse width control, the neutral-point potential fluctuation suppression control) are combined.

In the voltage command value control circuit 3 shown FIG. 5, in order to secure an on-pulse width of an output pulse by a final (third) voltage command value $V^{***}$, first the neutral-point potential fluctuation suppression control is executed in the neutral-point potential fluctuation suppression control section 4, then finally the minimum on-pulse width control is executed in a minimum on-pulse control section 5.

As a result, in a case where polarities of a bias voltage (hereinafter called a neutral-point bias voltage) $V_{NPC}$ added in the neutral-point potential fluctuation suppression control section 4 and a bias voltage (hereinafter called an on-pulse bias voltage) $V_{MPC}$ added in the minimum on-pulse control section 5 are different, there arise problems of lessening an effect of the neutral-point bias voltage $V_{NPC}$ and executing the minimum on-pulse width control in a direction that increases the neutral-point potential fluctuation.

On the other hand, there has been known a method in which a range of the voltage command value are divided into a plurality of areas, and a voltage vector of the inverter and its output order are previously fixed and stored according to this area, then the switching element is driven according to a modulation manner read out in response to the area of the voltage command value, thereby controlling a neutral-point voltage without being affected by the pulse width limit (see e.g. Patent Document 3). However, this method is an invention that concerns a single-phase NPC power converter. Further, since this method has such restriction that the switching is allowed only once for each change of the output vector, a problem of not being able to use this method for the three-phase NPC power converter has occurred.

Further, there has been known a method in which a Pbias and an Nbias are added to a carrier signal, and the minimum on-pulse width is secured (see e.g. Patent Document 4). However, since there is a possibility that the voltage command value in the vicinity of the zero-voltage crosses both upper and lower carrier signals during a time period during which the Pbias and the Nbias are added then the number of times of the switching becomes double for this time period, there is a risk that a switching loss and harmonic (higher harmonics) will increase.

Furthermore, there has been known a method in which a voltage reference is corrected so that a phase voltage outputted from the inverter becomes the zero-voltage before and after a time point when the phase voltage crosses zero (zero-crossing) for a predetermined time period (see e.g. Patent Document 4). Ina case of this method, although the minimum on-pulse width can be secured and this method is a control at a large modulation factor which reduces a tendency for the neutral-point potential fluctuation to occur, a bias is applied in a different direction from the neutral-point potential fluctuation suppression control, then there is a risk that an effect of the neutral-point potential fluctuation suppression control will be lessened.

In view of the foregoing, a main object of the present invention is to provide a power conversion device in which the on-pulse bias voltage and the neutral-point bias voltage do not interfere with each other.

The present invention was made in view of the above problems in the conventional arts. As an embodiment, a neutral-point-clamped multilevel power conversion device that converts a DC voltage outputted from a DC power supply having a neutral-point into an AC voltage pulse-width-modulated to any potential of a positive electrode, a negative electrode and the neutral-point, on the basis of a gate signal that is generated by comparing positive and negative triangular wave carriers with a voltage command value outputted from a voltage command value control circuit, is characterized in that the voltage command value control circuit has; a neutral-point potential fluctuation suppression control section that calculates a neutral-point bias voltage added to the voltage command value in order to suppress voltage fluctuation of the neutral-point of the DC power supply; a polarity judgment section that judges a polarity of the neutral-point bias voltage and outputs a polarity signal; and a minimum on-pulse control section that calculates an on-pulse bias voltage, positive/negative of which is fixed according to the polarity signal, the on-pulse bias voltage being a value that is added to the voltage command value to which the neutral-point bias voltage is added in order that the gate signal secures a predetermined minimum on-pulse width.

The minimum on-pulse control section, as an embodiment, has; a positive side calculation section that calculates a positive side bias voltage which is a positive and minimum value to be added to the voltage command value to which the neutral-point bias voltage is added in order that all phases become a pulse width that is greater than a predetermined minimum on-pulse width when the voltage command value is pulse-width-modulated; a negative side calculation section that calculates a negative side bias voltage which is a negative and minimum value to be added to the voltage command value to which the neutral-point bias voltage is added in order that all phases become a pulse width that is greater than a predetermined minimum on-pulse width when the voltage command value is pulse-width-modulated; and a selecting section that selects and outputs one of the positive side bias voltage and the negative side bias voltage according to the polarity signal.

The neutral-point potential fluctuation suppression control section, as an embodiment, has; a subtracter that calculates a deviation voltage between a voltage between the positive electrode and the neutral-point of the DC power supply and a voltage between the negative electrode and the neutral-point of the DC power supply; a proportional control section that performs a proportional control of the deviation voltage and calculates a magnitude of the neutral-point bias voltage; a power polarity judgment section that judges a polarity of a power factor of the power conversion device from an output current and an output voltage of the power conversion device and outputs a power polarity signal; and a switching section that switches the polarity of the neutral-point bias voltage according to the power polarity signal.

According to the present invention, it is possible to provide the power conversion device in which the on-pulse bias voltage and the neutral-point bias voltage do not interfere with each other.

EMBODIMENTS FOR CARRYING OUT THE INVENTION

A voltage command value control circuit of a power conversion device according to a present embodiment has a polarity judgment section that judges a polarity of a neutral-point bias voltage $V_{NPC}$ calculated by a neutral-point potential fluctuation suppression control section, and on the basis of this polarity of the neutral-point bias voltage $V_{NPC}$, a polarity of an on-pulse bias voltage $V_{MPC}$ is selected by an on-pulse control section. With this control, it is possible to prevent for the polarities of the neutral-point bias voltage $V_{NPC}$ and the on-pulse bias voltage $V_{MPC}$ from being different then prevent for the both bias voltages from interfering with each other.

Embodiment

First, a configuration of a power conversion device 1 to which a general NPC power converter 2 is applied will be explained with reference to FIG. 3. The NPC power converter 2 is a converter in which first, second, third and fourth switching elements (e.g. $S_{U1}$, $S_{U2}$, $S_{U3}$ and $S_{U4}$) are sequentially connected in series between a positive electrode and a negative electrode of a DC power supply having a neutral-point output terminal, a connect ion point between the first and second switching elements $S_{U1}$ and $S_{U2}$ and a connection point between the third and fourth switching elements $S_{U3}$ and $S_{U4}$ are each connected to the neutral-point output terminal through a clamping element such as a diode D, and a connection point between the second and third switching elements $S_{U2}$ and $S_{U3}$ becomes an output terminal. FIG. 3 shows a three-phase NPC power converter formed by providing three sets of this single-phase circuit.

A gate signal, which is generated by comparing positive and negative triangular wave carriers outputted from a carrier generating section (not shown) with a voltage command value outputted from a voltage command value control circuit 3 (see FIG. 1), is outputted to the switching element. Although a normal two-level inverter can output only two levels of positive and negative, this NPC power converter 2 can output three voltage levels as follows.

(a) When the switching elements $S_{U1}$ and $S_{U2}$ are ON: a positive potential of the DC power supply
(b) When the switching elements $S_{U2}$ and $S_{U3}$ are ON: a zero potential of the DC power supply
(c) When the switching elements $S_{U3}$ and $S_{U4}$ are ON: a negative potential of the DC power supply As a result, the NPC power converter 2 can reduce harmonic (higher harmonics) of the output voltage as compared with the two-level inverter.

Figure 1:
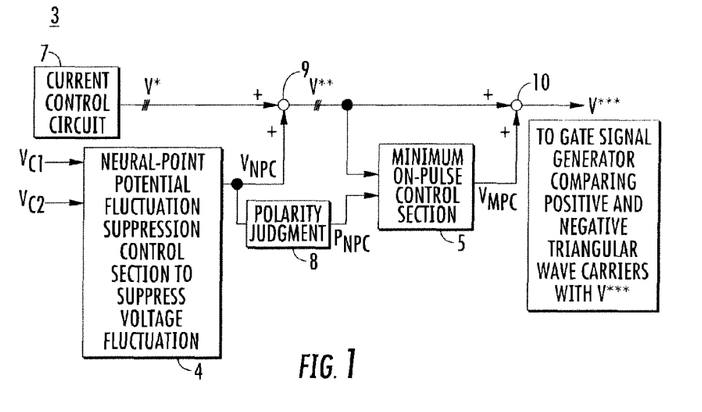
FIG. 1 is a block diagram showing an example of a voltage command value control circuit of a power conversion device according to an embodiment.

Next, a voltage command value control circuit 3' of the power conversion device 1 according to the present invention will be explained with reference to FIG. 1. As shown in FIG. 1, the voltage command value control circuit 3' of the power conversion device 1 of the present invention has a current control circuit 7, a neutral-point potential fluctuation suppression control section 4, a polarity judgment section 8 and a minimum on-pulse control section 5.

The current control circuit 7 outputs a first voltage command value V* to a first adder 9. The neutral-point potential fluctuation suppression control section 4 inputs capacitor voltages $V_{C1}$ and $V_{C2}$ (a voltage between the positive electrode and the neutral-point of the DC power supply and a voltage between the neutral-point and the negative electrode of the DC power supply), and outputs the neutral-point bias voltage $V_{NPC}$. This neutral-point bias voltage $V_{NPC}$ is added to the first voltage command value V* outputted from the current control circuit 7 at the first adder 9, also is outputted to the polarity judgment section 8.

The first voltage command value V* to which the neutral-point bias voltage $V_{NPC}$ is added at the first adder 9 is outputted, as a second voltage command value V, to a second adder 10 and the minimum on-pulse control section 5. The polarity judgment section 8 judges the polarity (positive and negative) of the neutral-point bias voltage $V_{NPC}$ and outputs it to the minimum on-pulse control section 5** as a polarity signal $P_{NPC}$.

The minimum on-pulse control section 5 calculates an on-pulse bias voltage $V_{MPC}$ on the basis of the second voltage command value V and the polarity signal $P_{NPC}$ and outputs it to the second adder 10. The second adder 10 adds the on-pulse bias voltage $V_{MPC}$ to the second voltage command value V, and outputs, it as a third voltage command value V*. This third voltage command value V* becomes the voltage command value that is compared with the positive and negative triangular wave carriers when the gate signal is generated.

Next, the neutral-point potential fluctuation suppression control section 4 of the present embodiment will be explained with reference to FIG. 4. The neutral-point potential fluctuation suppression control section 4 inputs the detected capacitor voltages $V_{C1}$ and $V_{C2}$ of capacitors $C_1$, $C_2$ (the voltage between the positive electrode and the neutral-point of the DC power supply and the voltage between the neutral-point and the negative electrode of the DC power supply), an inverter output voltage $V_{out}$ and an inverter output current $I_{out}$.

A deviation or difference between the capacitor voltages $V_{C1}$ and $V_{C2}$ is calculated by a subtracter 11, and it is outputted, as a deviation voltage $\Delta V_C$, to a proportional control section 12. This deviation voltage $\Delta V_C$ is calculated (e.g. PID-controlled) by the proportional control section 12, and its calculation result is outputted as a magnitude of the neutral-point bias voltage $V_{NPC}$.

Since a direction of the neutral-point potential, which changes by adding the neutral-point bias voltage $V_{NPC}$, depends on a polarity of a power factor, a judgment of the polarity of the power factor is made from a load and/or the inverter output voltage $V_{out}$ and/or the inverter output current $I_{out}$ in a power polarity judgment section 13, then its judgment result is outputted, as a power polarity signal $P_D$, to a switching section 14.

The switching section 14 selects the polarity of the neutral-point bias voltage $V_{NPC}$ on the basis of the power polarity signal $P_D$ and the polarity of the deviation voltage $\Delta V_C$ of the neutral-point. Here, in a case where the power polarity signal $P_D$ is "negative", a value obtained by multiplying a value outputted from the proportional control section 12 by "−1" is selected as the neutral-point bias voltage $V_{NPC}$. On the other hand, in a case where the power polarity signal $P_D$ is "positive", the value outputted from the proportional control section 12 is outputted as the neutral-point bias voltage $V_{NPC}$.

The neutral-point bias voltage $V_{NPC}$ generated in the above manner is added to first voltage command values $V_U^*$, $V_V^*$ and $V_W^*$ for each phase at the first adder 9 as shown in FIG. 1, then is outputted as second voltage command values $V_U^{}$, $V_V^{}$ and $V_W^{}$. Further, the polarity of the neutral-point bias voltage $V_{NPC}$ is judged by the polarity judgment section 8**.

Figure 2:
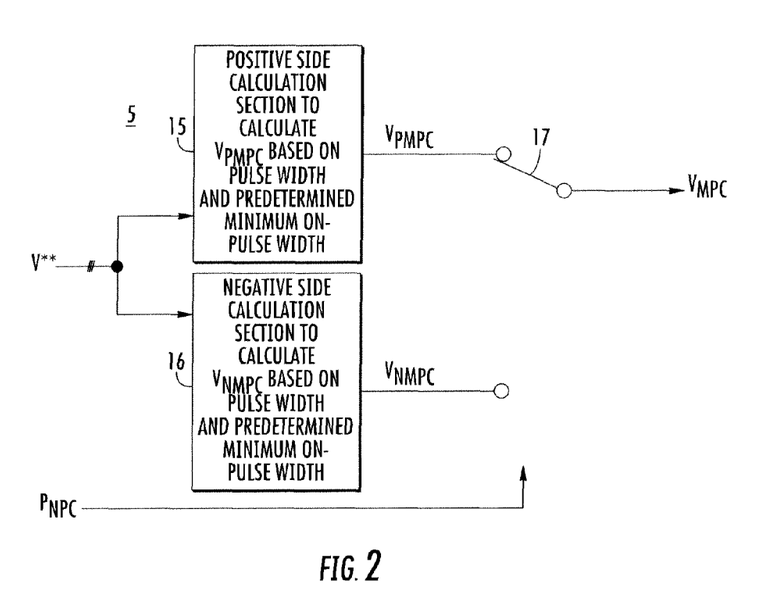
FIG. 2 is a block diagram of a minimum on-pulse control section according to the embodiment.

Here, a block diagram of the minimum on-pulse control section 5 of the present embodiment is shown in FIG. 2. This minimum on-pulse control section 5 has a positive side calculation section 15, a negative side calculation section 16 and a selecting section 17. The minimum on-pulse control section 5 inputs the second voltage command value V and the polarity signal $P_{NPC}$ outputted from the polarity judgment section 8**.

First, the second voltage command value V is inputted to the positive side calculation section 15 and the negative side calculation section 16. In the positive side calculation section 15, in order that all the phases become a pulse width that is greater than a predetermined minimum on-pulse width when the three-phase voltage command values are pulse-width-modulated (PWM-modulated), a positive side bias voltage $V_{PMPC}$, which is a "positive" and "minimum" value to be added to the second voltage command value V ($V_U^{}$, $V_V^{}$ and $V_W^{**}$), is calculated.

Likewise, in the negative side calculation section 16, in order that all the phases become a pulse width that is greater than a predetermined minimum on-pulse width when the three-phase voltage command values are pulse-width-modulated (PWM-modulated), a negative side bias voltage $V_{NMPC}$, which is a "negative" and "minimum" value to be added to the second voltage command value $V^{}$ ($V_U^{}$, $V_V^{}$ and $V_W^{}$), is calculated.

The positive side bias voltage $V_{PMPC}$ and the negative side bias voltage $V_{NMPC}$ determined in the above manner are selected on the basis of the polarity signal $P_{NPC}$ in the selecting section 17, and it is outputted as the on-pulse bias voltage $V_{MPC}$. Here, in a case where the polarity of the neutral-point bias voltage $V_{NPC}$ is the positive (in a case where the polarity signal $P_{NPC}$ is the positive), the positive side bias voltage $V_{PMPC}$ is selected and outputted as the on-pulse bias voltage $V_{MPC}$. On the other hand, in a case where the polarity of the neutral-point bias voltage $V_{NPC}$ is the negative (in a case where the polarity signal $P_{NPC}$ is the negative), the negative side bias voltage $V_{NMPC}$ is selected and outputted as the on-pulse bias voltage $V_{MPC}$.

Next, an operation when an absolute value of the second voltage command value is a predetermined value or less will be explained.

First, the positive side calculation section 15 and the negative side calculation section 16 set the values of the three phases of the second voltage command value $V^{**}$ as a maximum value $V_{max}$, a middle value $V_{mid}$ and a minimum value $V_{min}$ from the greater voltage command value.

Then, the positive side calculation section 15 calculates the positive side bias voltage $V_{PMPC}$, which is the "positive" and "minimum" value to be added in order that all the absolute values of the maximum value $V_{max}$, the middle value $V_{mid}$ and the minimum value $V_{min}$ become a threshold value or greater.

On the other hand, the negative side calculation section 16 calculates the negative side bias voltage $V_{PMPC}$, which is the "negative" and "minimum" value to be added in order that all the absolute values of the maximum value $V_{max}$, the middle value $V_{mid}$ and the minimum value $V_{min}$ become a threshold value or greater.

Finally, one of the positive side bias voltage $V_{PMPC}$ calculated in the positive side calculation section 15 and the negative side bias voltage $V_{NMPC}$ calculated in the negative side calculation section 16 is selected on the basis of the polarity signal $P_{NPC}$ in the selecting section 17.

In the following description, a specific calculation manner of the on-pulse bias voltage $V_{MPC}$ when the absolute value of the second voltage command value is the predetermined value or less will be explained.

First, the positive side calculation section 15 judges whether or not the absolute value of the maximum value $V_{max}$ is equal to or less than the threshold value (a threshold value of the voltage command value that is set so that the gate signal does not become the minimum on-pulse width or less on the basis of the minimum on-pulse width and a carrier frequency). If the absolute value of the maximum value $V_{max}$ is equal to or less than the threshold value, the positive side calculation section 15 calculates a bias value, which is the "positive" and "minimum" value to be added in order that the absolute value of the maximum value $V_{max}$ becomes the threshold value or greater, then adds it to all the maximum value $V_{max}$, the middle value $V_{mid}$ and the minimum value $V_{min}$.

Next, as same as the manner of the maximum value $V_{max}$, the positive side calculation section 15 judges whether or not the absolute value of the middle value $V_{mid}$ is equal to or less than the threshold value. If the absolute value of the middle value $V_{mid}$ is equal to or less than the threshold value, the positive side calculation section 15 calculates a bias value, which is the "positive" and "minimum" value to be added in order that the absolute value of the middle value $V_{mid}$ becomes the threshold value or greater, then adds it to all the maximum value $V_{max}$, the middle value $V_{mid}$ and the minimum value $V_{min}$.

Further, the positive side calculation section 15 judges whether or not the absolute value of the minimum value $V_{min}$ is equal to or less than the threshold value. If the absolute value of the minimum value $V_{min}$ is equal to or less than the threshold value, the positive side calculation section 15 calculates a bias value, which is the "positive" and "minimum" value to be added in order that the absolute value of the minimum value $V_{min}$ becomes the threshold value or greater, then adds it to all the maximum value $V_{max}$, the middle value $V_{mid}$ and the minimum value $V_{min}$.

Finally, a value obtained by adding the all bias values together is outputted as the positive side bias voltage $V_{PMPC}$.

On the other hand, the negative side calculation section 16 judges whether or not the absolute value of the maximum value $V_{max}$ is equal to or less than the threshold value. If the absolute value of the maximum value $V_{max}$ is equal to or less than the threshold value, the negative side calculation section 16 calculates a bias value, which is the "negative" and "minimum" value to be added in order that the absolute value of the maximum value $V_{max}$ becomes the threshold value or greater, then adds it to all the maximum value $V_{max}$, the middle value $V_{mid}$ and the minimum value $V_{min}$.

Next, as same as the manner of the maximum value $V_{max}$, the negative side calculation section 16 judges whether or not the absolute value of the middle value $V_{mid}$ is equal to or less than the threshold value. If the absolute value of the middle value $V_{mid}$ is equal to or less than the threshold value, the negative side calculation section 16 calculates a bias value, which is the "negative" and "minimum" value to be added in order that the absolute value of the middle value $V_{mid}$ becomes the threshold value or greater, then adds it to all the maximum value $V_{max}$, the middle value $V_{mid}$ and the minimum value $V_{min}$.

Further, the negative side calculation section 16 judges whether or not the absolute value of the minimum value $V_{min}$ is equal to or less than the threshold value. If the absolute value of the minimum value $V_{min}$ is equal to or less than the threshold value, the negative side calculation section 16 calculates a bias value, which is the "negative" and "minimum" value to be added in order that the absolute value of the minimum value $V_{min}$ becomes the threshold value or greater, then adds it to all the maximum value $V_{max}$, the middle value $V_{mid}$ and the minimum value $V_{min}$.

Finally, a value obtained by adding the all bias values together is outputted as the negative side bias voltage $V_{NMPC}$.

Lastly, one of the positive side bias voltage $V_{PMPC}$ calculated in the positive side calculation section 15 and the negative side bias voltage $V_{NMPC}$ calculated in the negative side calculation section 16 is selected on the basis of the polarity signal $P_{NPC}$ in the selecting section 17.

Here, when the values of the three phases of the second voltage command value $V^{}$ are not present in the vicinity of zero and all the gate signals of the three phases are the predetermined minimum on-pulse width or greater (i.e. when the absolute values of the second voltage command values $V^{}$ of the three phases are the threshold value or greater), the positive side bias voltage $V_{PMPC}$ and the negative side bias voltage $V_{NMPC}$ become zero, and the second voltage command value V becomes equal to the third voltage command value V* (the second voltage command value V=the third voltage command value V*).

In this manner, by selecting the polarity of the minimum on-pulse bias voltage $V_{MPC}$ with consideration given to the polarity of the neutral-point bias voltage $V_{NPC}$, when at least one phase or more of the second voltage command values (=$V_U^{}$, $V_V^{}$ and $V_W^{**}$) of the three phases is present in the vicinity of zero and the minimum on-pulse control works, the on-pulse bias voltage $V_{MPC}$ whose direction is the same as the neutral-point bias voltage $V_{NPC}$ is added. As a consequence, the lessening of the effect of the neutral-point potential fluctuation suppression control and the execution of the control system in the direction that increases the neutral-point potential fluctuation, which are due to the fact that the on-pulse bias voltage $V_{MPC}$ whose direction is opposite to the neutral-point bias voltage $V_{NPC}$ is added, can be suppressed.

That is, since the control is performed so as to fix the polarity of the on-pulse bias voltage $V_{MPC}$ by the polarity of the power factor of the NPC power converter 2 and the polarity of the deviation voltage $\Delta V_C$ of the neutral-point, it is possible to prevent the degradation in response of the neutral-point potential fluctuation suppression control caused by the minimum on-pulse width securing control (it is possible to prevent the neutral-point potential fluctuation suppression control from being lessened or prevent the neutral-point potential fluctuation from increasing).

Further, according to the present embodiment, the neutral-point potential fluctuation suppression control and the minimum on-pulse width securing control can be performed without increasing the number of times of the switching, and it is possible to suppress an increase in a power loss due to the switching loss etc.

Although the present invention has been explained in detail only for the embodiment described above, variations and modifications of the present invention are possible within the scope of the technical idea or concept, and it is obvious to those skilled in the art. The variations and modifications belong to the scope of claims.

For instance, in the embodiment, the calculation manners of the on-pulse bias voltage $V_{MPC}$ and the neutral-point bias voltage $V_{NPC}$ are explained in detail using the specific example. However, as long as a manner is a manner in which the polarity of the on-pulse bias voltage $V_{MPC}$ is selected on the basis of the polarity of the neutral-point bias voltage $V_{NPC}$, any calculation manner can be used.

The invention claimed is:

1. A neutral-point-clamped multilevel power conversion device that converts a DC voltage outputted from a DC power supply having a neutral-point into an AC voltage pulse-width-modulated to any potential of a positive electrode, a negative electrode and the neutral-point, on the basis of a gate signal that is generated by comparing positive and negative triangular wave carriers with a voltage command value, comprising
 a voltage command value control circuit that outputs the voltage command value, and wherein
 the voltage command value control circuit has
 a neutral-point potential fluctuation suppression control section that calculates a neutral-point bias voltage added to the voltage command value in order to suppress voltage fluctuation of the neutral-point of the DC power supply;
 a polarity judgment section that judges a polarity of the neutral-point bias voltage and outputs a polarity signal; and
 a minimum on-pulse control section that calculates an on-pulse bias voltage, positive/negative of which is fixed according to the polarity signal, the on-pulse bias voltage being a value that is added to the voltage command value to which the neutral-point bias voltage is added in order that the gate signal secures a predetermined minimum on-pulse width, wherein:
 the minimum on-pulse control section has
 a positive side calculation section that calculates a positive side bias voltage which is a positive and minimum value to be added to the voltage command value to which the neutral-point bias voltage is added in order that all phases become a pulse width that is greater than a predetermined minimum on-pulse width when the voltage command value is pulse-width-modulated;
 a negative side calculation section that calculates a negative side bias voltage which is a negative and minimum value to be added to the voltage command value to which the neutral-point bias voltage is added in order that all phases become a pulse width that is greater than a predetermined minimum on-pulse width when the voltage command value is pulse-width-modulated; and
 a selecting section that selects and outputs one of the positive side bias voltage and the negative side bias voltage according to the polarity signal.

2. A neutral-point-clamped multilevel power conversion device that converts a DC voltage outputted from a DC power supply having a neutral-point into an AC voltage pulse-width-modulated to any potential of a positive electrode, a negative electrode and the neutral-point, on the basis of a gate signal that is generated by comparing positive and negative triangular wave carriers with a voltage command value, comprising
 a voltage command value control circuit that outputs the voltage command value, and wherein
 the voltage command value control circuit has
 a neutral-point potential fluctuation suppression control section that calculates a neutral-point bias voltage added to the voltage command value in order to suppress voltage fluctuation of the neutral-point of the DC power supply;
 a polarity judgment section that judges a polarity of the neutral-point bias voltage and outputs a polarity signal; and
 a minimum on-pulse control section that calculates an on-pulse bias voltage, positive/negative of which is fixed according to the polarity signal, the on-pulse bias voltage being a value that is added to the voltage command value to which the neutral-point bias voltage is added in order that the gate signal secures a predetermined minimum on-pulse width, wherein:
 the neutral-point potential fluctuation suppression control section has
 a subtracter that calculates a deviation voltage between a voltage between the positive electrode and the neutral-point of the DC power supply and a voltage between the negative electrode and the neutral-point of the DC power supply;
 a proportional control section that performs a proportional control of the deviation voltage and calculates a magnitude of the neutral-point bias voltage;
 a power polarity judgment section that judges a polarity of a power factor of the power conversion device from an output current and an output voltage of the power conversion device and outputs a power polarity signal; and a switching section that switches the polarity of the neutral-point bias voltage according to the power polarity signal.

\* \* \* \* \*